United States Patent [19]

Fan et al.

[11] Patent Number: 4,995,046
[45] Date of Patent: Feb. 19, 1991

[54] ROOM TEMPERATURE 1.5 μM BAND QUSAI-THREE-LEVEL LASER

[75] Inventors: Yuan X. Fan, Mountain View; Richard G. Schlecht, San Jose, both of Calif.

[73] Assignee: Laserqenics, San Jose, Calif.

[21] Appl. No.: 397,410

[22] Filed: Aug. 23, 1989

[51] Int. Cl.$^5$ .............................................. H01S 3/16
[52] U.S. Cl. ........................................ 372/41; 372/40
[58] Field of Search ...................... 372/41, 40, 70, 75

[56] References Cited

U.S. PATENT DOCUMENTS 4,764,933  8/1988  Kozlovsky et al. .................. 372/40

OTHER PUBLICATIONS

Tso Yee Fan et al., "Modeling and CLS Operation of a Quasi-Three-Level 946 nm Nd:YAG Laser", *IEEE Journal of Quantum Electronics*, vol. QE-23, No. 5, May 1987, pp. 605-612.

*Primary Examiner*—James W. Davie
*Attorney, Agent, or Firm*—Flehr, Hohbach, Test, Albritton & Herbert

[57] ABSTRACT

A room temperature, 1.5 μm band laser is described. The lasant material in the preferred embodiment is Er:YAG with a 1% $Er^{3+}$ doping. The pumping radiation is an intense 1.53 μm beam produced by a laser diode. The solid-state lasant material produced 1.5 μm band radiation with high efficiency.

23 Claims, 2 Drawing Sheets

ROOM TEMPERATURE 1.5 μM BAND QUSAI-THREE-LEVEL LASER

BACKGROUND OF THE INVENTION

This invention relates to lasers and, more particularly, to a method and apparatus for producing 1.5 μm band radiation efficiently by a quasi-three-level laser transition system.

Laser radiation typically is produced in a material by a three-level or by a four-level transition system. The distinction is this: In a three-level system the lower level for fluorescence is the ground level, i.e., the level with lowest energy, whereas in a four-level system the lower level lies above the ground level. Three-level systems generally are not efficient enough for practical use. To create the population inversion necessary for lasing action, one must "pump" atomic, ionic or molecular particles from one or more energy levels to higher energy levels. Since there are significantly more particles populating the ground level than higher energy levels, it is generally quite difficult in a three-level system to obtain the required energy population inversion. In a four-level system on the other hand, the lower laser energy level that is used for laser transitions typically is much higher than the ground level and therefore can be almost completely unpopulated, even at room temperature. In other words, the energy threshold to cause a population inversion at any particular temperature is lower in a four-level energy transition system than in a three-level system, resulting in a higher laser transition probability. Because of this, four-level laser transition systems are more efficient and more widely used to generate laser radiation than three-level transition systems.

"Quasi-three-level" laser transition systems are also known. For example, reference is made to the papers by L. F. Johnson, et al. which appeared in "Applied Physics Letters", Vol. 7, pp. 127-129, 1965; K. 0. White, et al., "Applied Physics Letters", Vol. 21, pp. 419-420, 1972; G. M. Zerev, et al., the "Journal of Applied Spectroscopy" (USSR), Vol. 21, pp. 1467-1469, 1974; and Tso Yee Fan, et al., "IEEE J. of Quantum Electronics", QE-23, pp. 605-612, 1987. A quasi-three-level system is one in which the lower energy state of the laser transition is close to the ground state but yet is a thermally populated state. The lower, thermally populated state generally is in a ground state manifold. In this connection, energy state manifolds are defined in a solid state lasant material by the dopant, whereas the crystalline or glass host plays a significant roll in determining the number and location of the energy levels in each of such manifolds. While quasi-three-level transitions have been observed at room temperature, generally high energy thresholds have been required in all prior arrangements to provide the necessary population inversion. This has significantly reduced efficiency.

High power 1.5 μm band radiation is of particular interest in optical communications, military systems and medical systems. This wavelength is eye-safe and coincides with the low loss window of fused silica fibers. Most efforts in the past to provide radiation within the 1.5 μm band, i.e., radiation having a wavelength or wavelengths falling between 1.4 and 1.6 μm, have focused on the co-doping of a host crystalline or glass material. Examples of co-doping approaches to obtain this wavelength and other wavelengths can be found in U.S. Pat. Nos. 3,715,683; 4,081,761; 4,477,906; and 4,701,928. It will be recognized that a co-doping approach is inherently less efficient than one which relies on a single ion for both absorbing pumping radiation and lasing, in view of the need to provide energy transference between ions.

Other sources of 1.5 μm band radiation at the time of filing this patent application are $F^+$-center lasers and semiconductor diode lasers. The $F^+$-center laser is delicate, operates at cryogenic temperatures and is not stable. While semiconductor diodes have the advantage of small size, their beam quality is not satisfactory for many applications.

SUMMARY OF THE INVENTION

The present invention relates to a method and apparatus for producing laser radiation from a solid-state lasant material efficiently by a quasi-three-level laser transition system. It has been found that in certain circumstances if (1) both the pumping radiation and the desired laser radiation are defined by energy levels of a single dopant; (2) the pumping energy is concentrated in the absorption frequencies of the dopant; and (3) the concentration (doping) of potential lasing ions is not sufficiently high that there are significant up-conversion processes or reduced upper state lifetimes (significant energy transfer between the dopant ions), efficient and high power lasing is achieved from the same ions that absorb the pumping radiation. 1.5 μm band radiation can be obtained with a low pumping threshold from an erbium doped yttrium aluminum garnet (Er:YAG) solid-state material having a 1% $Er^{3+}$ concentration.

As mentioned previously, in a solid state laser a dopant material provides the energy manifolds whereas the host material plays a significant role in defining the energy levels into which each manifold is split. In this invention, the energy level or levels of the ground state manifold which are responsible for causing the population inversion necessary for lasing action preferably are above the ground energy level. This reduces the threshold power necessary to cause the population inversion, since such levels are not as highly populated as the ground energy level. It is to be noted, though, that it is believed that once such energy levels are at least partially depopulated, redistribution will occur in the ground state manifold as necessary to maintain the distribution ratio, with the result that the ground state level also will be depopulated. Consequent lasing to this level therefore can occur.

As brought out above, it is important that the doping concentration be maintained low. It must not be high enough that the dopant ions are sufficiently close together for significant energy up-conversion processes as described, for example, in the Pollack, et al. paper entitled "Threefold Upconversion Laser at 0.85, 1.23 and 1.73 μm in Er:YLF Pumped with a 1.53 μm Er Glass Laser" which appeared in "Applied Physics Letters", Vol. 54, No. 10, pp. 869-871 (Mar. 6, 1989). Moreover, it must be kept low for longer excited upper state lifetimes relative to lifetimes in the lower states.

It will be seen from the above that a quasi-three-level laser transition system can be utilized efficiently to provide desired laser radiation in a low percentage doped Er:YAG laser by concentrating the frequency or frequencies of pumping energy to be between the very same energy state manifolds that produce the desired lasing radiation. Other features and advantages of the invention will become apparent or will be described in connection with the following detailed description of a preferred embodiment.

BRIEF DESCRIPTION OF THE DRAWINGS

With reference to the accompanying single sheet of drawing.

DETAILED DESCRIPTION OF THE DRAWINGS

Figure 1:
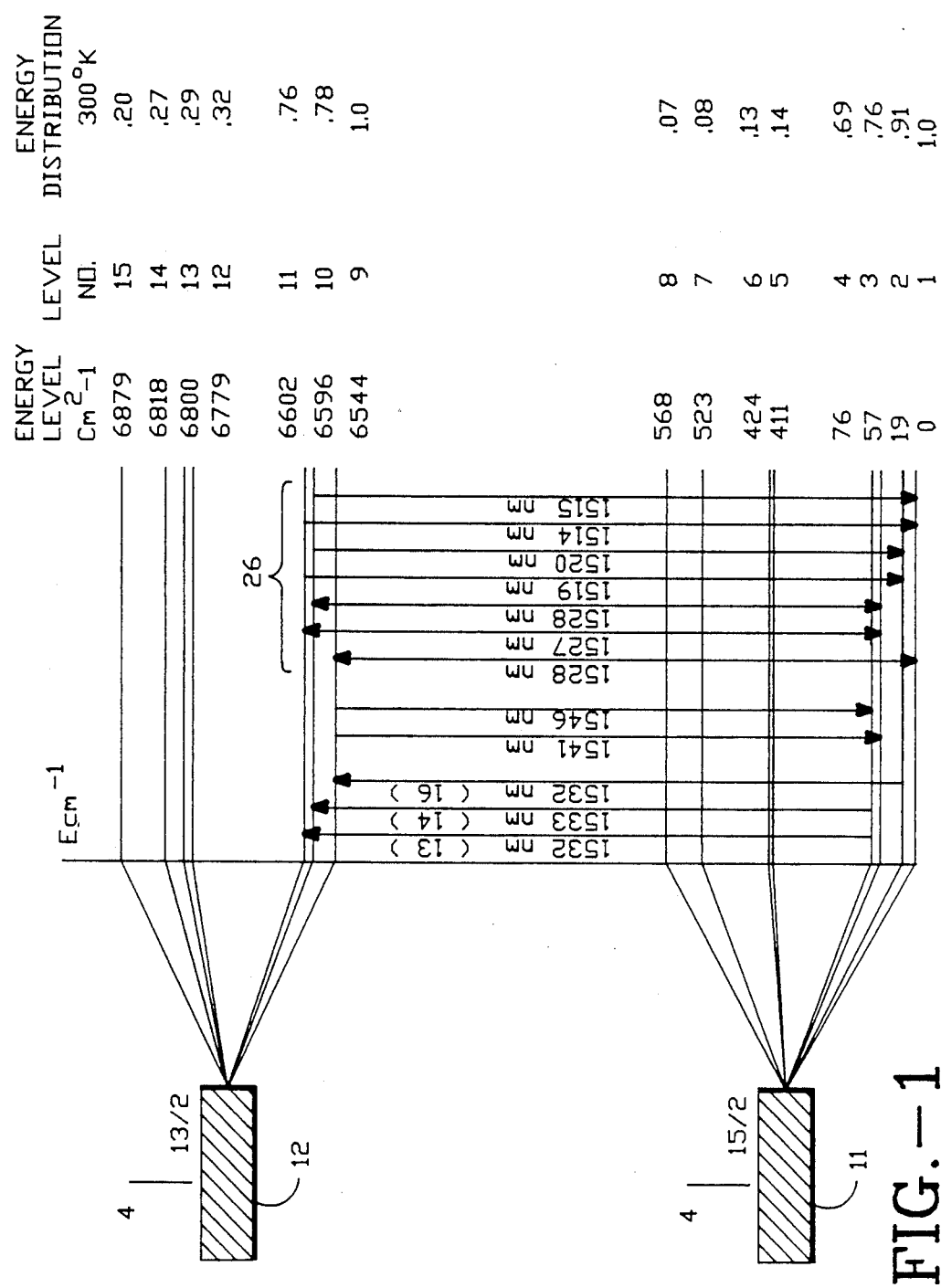
FIG. 1 is an energy level diagram illustrating the $^4I_{13/2}$ and $^4I_{15/2}$ energy manifolds of an Er:YAG laser and the energy distributions associated with the levels of each manifold at 300° K.

As mentioned above, FIG. 1 is an energy level diagram of an Er:YAG solid-state material at 300° K. The energy state manifolds illustrated are the ground state manifold, the $^4I_{15/2}$ manifold, referred to by the reference numeral 11, and the next higher energy state manifold, the $^4I_{13/2}$ manifold, referred to by the reference numeral 12. While there are many energy manifolds in an Er:YAG laser as defined, this ground state manifold and the immediately adjacent higher one define between the two, the wavelength band of interest for the laser radiation and appropriate absorption spectra. As illustrated, the ground state manifold includes not only the ground state energy level (identified as level 1) but seven other levels. In this connection, the Boltzmann distribution factor for each level within each manifold at 300° K. is set forth in FIG. 1. Each level forms a Kramers doublet. This manifold splits into two distinct groups separated by approximately 450 cm$^{-1}$ as illustrated with levels 1-4 within 76 cm$^{-1}$ of one another. This group is the ground state group with the first level being the ground state and the 2nd through the 4th levels being quasi-ground states. Most of the Er ions are in the ground state group at room temperature, distributed among the energy levels as indicated by the Boltzmann energy distribution factors.

The higher energy manifold 12 is similar to the ground state manifold, in that the energy levels within the same form two distinct groups as illustrated, with levels 9-11 in one group and levels 12-15 in another. These two groups are separated by about 250 cm$^{-1}$. It is the lower of these two groups which, with the ground state group in the ground state manifold, defines with one embodiment of the invention both the frequencies of the radiation of interest and the absorption spectrum to assure that a population inversion and consequent lasing will occur with the single type of dopant. The energy levels in manifold 12 also have very long lifetimes, on the order of several milliseconds, relative to those in manifold 11. It has been found that a 1% doped Er:YAG crystal at room temperature has a major absorption band at 1.51-1.54 $\mu$m. While this band includes two absorption peaks located at 1.528±0.001 $\mu$m and 1.533±0.001 $\mu$m, optical source for pumping is selected having an output energy concentrated at least one of these absorption peaks.

When an Er:YAG crystal as defined is pumped with an intense 1.5 $\mu$m wavelength band source, Er ions in the ground state group are excited to the lower energy levels of the upper manifold. While in a typical three-level transition system a population inversion is created by pumping the population from the ground state level (the first level) to a higher level, for 1.5 $\mu$m band pumping of Er:YAG solid-state material meeting the criteria of the invention, the population inversion occurs by pumping the population from the energy levels in the ground state manifold identified as the 2nd and 4th levels. They are pumped to the 9th, 10th and 11th levels. This is represented in FIG. 1 by lines 13, 14 and 16. At room temperature, while 26% of the population of Er ions in the ground state manifold are at the 1st energy level, a total of 48% are in the 2nd and 4th levels. Moreover, because of redistribution of the energy of the ions in the ground state manifold, the pumping process depletes all of such levels. This is quite significant in reducing the pump threshold that is necessary to achieve lasing action. This contributes significantly to the efficiency of the laser as will be discussed below.

Figure 2:
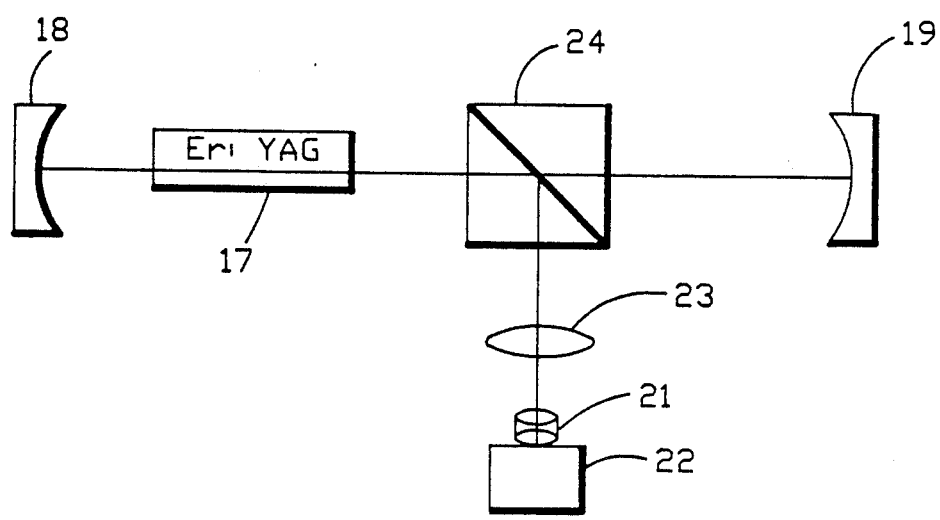
FIG. 2 is a schematic illustration of a preferred embodiment of the invention.

FIG. 2 illustrates a laser arrangement designed to advantageously utilize the invention. With reference to such figure, a solid-state lasant material, a Er:YAG crystal meeting the criteria of the invention, is generally referred to by the reference numeral 17. Both ends of the same are dielectrically coated to have a suitably low reflectivity for the laser and pump radiation. Such crystal is located within a laser resonant cavity defined by mirrors 18 and 19, respectively, the mirror 19 having an appropriately reduced reflectivity for the lasing radiation of interest to provide the laser output.

The pumping source, a semiconductor diode as described above, is illustrated at 21. It is mounted on a thermoelectric cooler 22 which enables slight tuning for frequency matching. The output of the pump source is focused via a lens 23 into a polarization beam splitting cube 24 positioned to couple the output of the diode pump to the resonator.

The Er:YAG crystal will emit 1.5 $\mu$m coherent radiation when the excited ions decay from the lower group of the upper manifold to the ground state group of the lower manifold. When resonation causes the gain of 1.5 $\mu$m band radiation to be higher than its loss for each round trip, the lasant material will emit a 1.5 $\mu$m band laser beam.

Two major emission lines in the 1.5-1.6 $\mu$m wavelength range have been observed at 1.543±0.006 $\mu$m and 1.525 ±0.006 $\mu$m. (It should be noted that the energy level diagram of FIG. 1 has been developed from published data. In practice, emissions or absorptions which are empirically determined may be made up of two or more of the emissions or absorptions which have been reported. Moreover, others may be too weak to be observed.) The upper manifold laser level is the 9th level for the 1.543 $\mu$m emission, and the 9th, 10th and 11th levels for the 1.525 $\mu$m emission. The laser levels in the lower manifold are the 3rd and 4th levels for the 1.543 $\mu$m emission and the 1st, 2nd and 3rd levels for the 1.525 $\mu$m emission. It is postulated that this output radiation is caused by, and is made up of, transitions between the upper and lower manifold represented by the lines 26 indicated in FIG. 1. It should be noted that certain of such lines illustrate transitions to the ground energy level of the ground state manifold 11. Some of these postulated transitions are three-level transitions rather than quasi-three-level transitions.

The efficiency of a laser is defined as the ratio of output power to input power. It depends on the quantum efficiency (the number of laser photons generated by each absorbed pump photon), the quantum defect (the energy difference between the pump photon and the laser photon) and the pump efficiency, including the pump absorption efficiency of the laser material and the electrical-optical efficiency of the pump source. We can assume a quantum efficiency of 1 with the invention due to the long lifetime of the laser levels in the upper manifold. One of the outstanding properties of this invention is its small quantum defect which allows a quantum energy efficiency of 99%. (The quantum energy efficiency of a laser is the ratio of the laser photon energy to the pump photon energy, determined by $(\lambda_p/\lambda_s)$ where $\lambda_p$ is the pump wavelength and $\lambda_s$ is the laser wavelength.) This 99% quantum energy efficiency is extraordinarily high compared with, for example, the 76% obtained with a conventional diode pumped four-level 1.06 μm Nd:YAG laser.

An efficient pump source is a InGaAsP diode laser which typically has a quantum efficiency in Watts per Ampere of 30–45%, and an electrical-optical conversion efficiency of 25–40%. By single mode InGaAsP diode pumping, the pump power absorption efficiency could exceed 90%. Therefore, an optical conversion efficiency of 90% and an overall conversion efficiency of 22–36% can be achieved.

EXAMPLE

In one specific embodiment of the invention, the crystal 17 was a 2 cm long, ¼" diameter rod with a 1% $Er^{3+}$ doping. Both ends of the same were AR coated. Mirror 18 was a concave mirror having a radius of curvature of 10 cm. Mirror 19 also was a concave mirror that had a radius of curvature of 25 cm. The diode laser pump was a GaInAsP laser diode.

The above arrangement was operated with the pump diode laser maintained at a temperature of approximately 9° C. to have an output beam in the 1.53 band range. Such beam had a power in the range of between 55 and 65 milliwatts. Its output was polarized and coupled into the lasant material in the manner described above. The result was 1.5 μm band continuous wave lasing of TEMoo mode radiation. Two laser lines at 1.543±0.006 μm and 1.525±0.006 μm were obtained having an intensity ratio of 10:7. The FWHM bandwidths were respectively 6 nm and 6.4 nm. The total output power of the 1.5 μm lasing radiation was 11.5 milliwatts, with an absorbed diode pump power of 29.9 milliwatts of a total diode laser output of 57 milliwatts.

It can be calculated from the above that the conversion efficiency was 38.5%. This efficiency is much higher than conventional three-level systems and as high as, or even higher than, previous four-level transition systems. Also, because of the high quantum energy efficiency and long lifetime of the lower energy levels in the upper manifold, meaningful Q-switched operation is possible. Moreover, the laser operates at room temperature, is diode pumped, and has an all solid-state configuration—resulting in a compact, rigid, stable and reliable laser. These desirable features make the laser of the instant invention particularly desirable for many optical communication, military and medical applications as mentioned above.

The absorption spectrum of Er:YAG also has a major absorption band at 1.45–1.49 μm. This coincides with absorption transitions between the ground state group of energy levels in manifold 11 and the upper energy level group, levels 12–15, of the manifold 12. It is postulated that pumping of the Er:YAG lasant material described above with a source providing an output concentrated within such absorption band will result in lasing action between such upper group of manifold 12 and the ground state group of manifold 11, providing meaningful laser output at 1.45–1.49 μm.

Although the invention has been described in connection with preferred embodiments in order to assure that the patent laws regarding disclosure are satisfied, it will be recognized by those skilled in the art that various changes and modifications can be made without departing from the spirit of the same. It is therefore intended that the coverage afforded applicant be limited only by the claims and their equivalent language.

What is claimed is:

1. A method for producing laser radiation from a solid-state lasant material efficiently by a quasi-three-level laser transition system, comprising the steps of:
   a. providing a solid-state lasant material made up of a host material and a single dopant within the same which is in a concentration which is not sufficiently high to provide up-conversion or significant energy transfer between dopant particles, said lasant material having a ground state energy manifold and at least one other higher energy manifold, both of which have a plurality of energy levels defining between said manifolds one or more frequencies at which optical energy is absorbable and one or more frequencies making up the desired radiation;
   b. selecting a source of optical pumping energy having an optical output concentrated at one or more frequencies which are generally the same as said one or more frequencies which are absorbable;
   c. pumping said lasant material with the optical output of said source to cause a population inversion between energy levels respectively of said ground state and higher energy manifolds and consequent lasing of the desired radiation;
   d. enclosing said solid-state lasant material within a resonant cavity selected to oscillate said desired radiation within said material; and
   e. generating output radiation from said resonant cavity.

2. The method of claim 1 wherein the energy level or levels of said ground state manifold responsible for causing said population inversion are above the ground energy level of said manifold.

3. The method of claim 1 wherein the radiation which lases as a consequence of said step of pumping has a plurality of frequencies.

4. The method of claim 1 wherein said solid-state lasant material that is provided has a plurality of energy manifolds having an energy value greater than said ground state manifold, and said one other higher energy manifold of the material that is provided is the lower one of said plurality of energy manifolds.

5. The method of claim 1 wherein the solid-state lasant material provided in said step of providing is a rare earth doped crystalline material.

6. The method of claim 5 wherein said rare earth is erbium.

7. The method of claim 5 wherein said solid-state lasant material that is provided is Er:YAG.

8. The method of claim 6 wherein said material is a crystalline material that is doped with erbium to a concentration less than about 10%.

9. The method of claim 7 wherein said Er:YAG solid-state material that is provided has a 1% Er doping.

10. The method of claim 1 wherein the one or more frequencies at which optical energy is absorbable and the one or more frequencies of desired radiation provided by the solid-state lasant material are predominately within the radiation wavelength range of 1.4 μm to 1.6 μm.

11. The method of claim 10 wherein said step of selecting a source of optical pumping energy have an optical output concentrated at a frequency or frequencies which are generally the same as said one or more frequencies which are absorbable comprises the step of selecting a source of optical energy having an optical output of about 1.53 μm, and said step of providing a solid-state lasant material having a ground state energy manifold and at least one other higher energy manifold comprises the step of providing such a material between said manifolds defining between said manifolds lasing frequencies of about 1.525 μm and 1.543 μm.

12. The method of claim 11 wherein the step of providing a solid-state lasant material comprises providing Er:YAG having a 1% erbium doping.

13. A quasi-three-level laser comprising:
   a. a solid-state lasant material made up of a host material and a single dopant within the same which is in a concentration which is not sufficiently high to provide significant energy transfer between dopant particles, said lasant material having a single ground state energy manifold and at least one other higher energy state manifold, both of which have a plurality of energy levels defining between said manifolds one or more frequencies at which optical energy is absorbable and the one or more frequencies making up the desired radiation;
   b. a source of optical pumping energy having an optical output concentrated at one or more frequencies which are generally the same as said one or more frequencies which are absorbable;
   c. means for coupling optical pumping energy from said source into said solid-state lasant material to cause a population inversion or inversions between energy levels of said two manifolds;
   d. a resonant cavity enclosing said solid-state lasant material selected to oscillate said desired radiation within said material; and
   e. means for generating output radiation from said resonant cavity.

14. The laser of claim 13 wherein said one or more frequencies at which optical energy is absorbable and the one or more frequencies of the desired radiation have wavelengths in the range between about 1.4 μm and 1.6 μm.

15. The laser of claim 14 wherein said source of optical pumping energy is a semiconductor diode mounted in thermal contact with a thermoelectric cooler to enable output tuning to match its output with the absorption spectrum defined by energy levels of said two manifolds.

16. The laser of claim 15 wherein said solid-state lasant material is Er:YAG.

17. The laser of claim 16 wherein said ground state energy manifold and said one other higher energy state manifold respectively are the $^4I_{15/2}$ and the $^4I_{13/2}$ manifolds of said material.

18. The laser of claim 17 wherein said frequency at which said optical pumping energy is concentrated is between 1.4 μm and 1.6 μm.

19. The laser of claim 16 wherein said material has about a 1% erbium doping.

20. A method for producing laser radiation from a solid-state lasant material efficiently by a quasi-three-level laser transition system, comprising the steps of:
   a. providing a solid-state lasant material made up of a host material and a single dopant within the same which is in a concentration which is not sufficiently high to provide significant energy transfer between dopant particles, said lasant material having a ground state energy manifold and at least one other higher energy manifold, both of which have a plurality of energy levels defining between said manifolds one or more frequencies at which optical energy is absorbable and one or more frequencies making up the desired radiation; and
   b. forcing a population inversion between energy levels of said two manifolds and consequent lasing of the desired radiation by coupling optical pumping energy into said lasant material having an optical output concentrated at one or more frequencies which are generally the same as said one or more frequencies which are absorbable.

21. The method of claim 20 wherein said step of providing a solid-state lasant material comprises providing a Er:YAG material.

22. The method of claim 21 wherein said step of providing the solid-state lasant material comprises providing a Er:YAG material having a 1% erbium doping.

23. The method of claim 21 wherein said step of providing a solid-state lasant material comprises providing a Er:YAG material within which said ground state energy manifold is the $^4I_{15/2}$ and said other higher energy manifold is the $^4I_{13/2}$ manifold.

* * * * *